US012517719B2

(12) United States Patent
Ishikawa et al.

(10) Patent No.: US 12,517,719 B2
(45) Date of Patent: Jan. 6, 2026

(54) MOBILE EQUIPMENT AND SOFTWARE DISTRIBUTION SYSTEM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 18/455,877

(22) Filed: Aug. 25, 2023

(65) Prior Publication Data

US 2024/0118886 A1 Apr. 11, 2024

(30) Foreign Application Priority Data

Oct. 5, 2022 (JP) ................. 2022-160958

(51) Int. Cl.
*G06F 8/65* (2018.01)
*G06F 8/71* (2018.01)
*H04L 67/56* (2022.01)
*H04W 4/40* (2018.01)

(52) U.S. Cl.
CPC ............. *G06F 8/65* (2013.01); *G06F 8/71* (2013.01); *H04L 67/56* (2022.05); *H04W 4/40* (2018.02)

(58) Field of Classification Search
CPC ... G06F 8/65; G06F 8/71; H04L 67/56; H04L 67/34; H04W 4/40
See application file for complete search history.

(56) References Cited

U.S. PATENT DOCUMENTS

| 2002/0116099 | A1* | 8/2002 | Tabata | F02D 13/06 |
| | | | | 903/905 |
| 2021/0155252 | A1* | 5/2021 | Harata | G06F 8/65 |
| 2021/0165649 | A1* | 6/2021 | Harata | G06F 3/0679 |
| 2021/0167988 | A1* | 6/2021 | Harata | H04W 4/40 |
| 2022/0179641 | A1* | 6/2022 | Harata | B60R 16/02 |
| 2022/0319632 | A1* | 10/2022 | Kaur | G11C 29/808 |
| 2023/0005305 | A1* | 1/2023 | Sakurai | G06F 13/00 |
| 2024/0403027 | A1* | 12/2024 | Shiozawa | G06F 8/65 |

FOREIGN PATENT DOCUMENTS

| JP | 2017149323 A | 8/2017 | |
| WO | WO-2023007577 A1 * | 2/2023 | .............. G06F 8/65 |

* cited by examiner

*Primary Examiner* — Daxin Wu
(74) *Attorney, Agent, or Firm* — Dickinson Wright, PLLC

(57) ABSTRACT

Mobile equipment includes one or more first processors and a communication module. The one or more first processors are configured to generate a package including update software and rollback data. The one or more first processors are configured to control the communication module to send the package to a vehicle.

8 Claims, 9 Drawing Sheets

FIG. 2
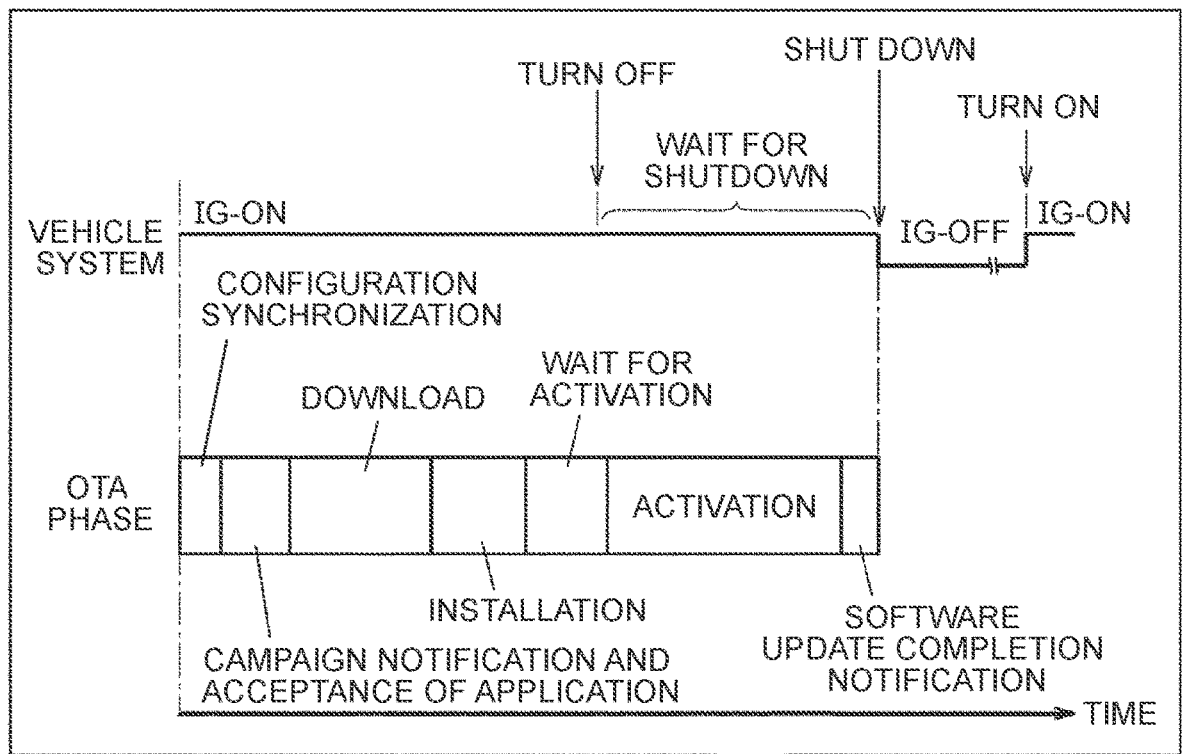
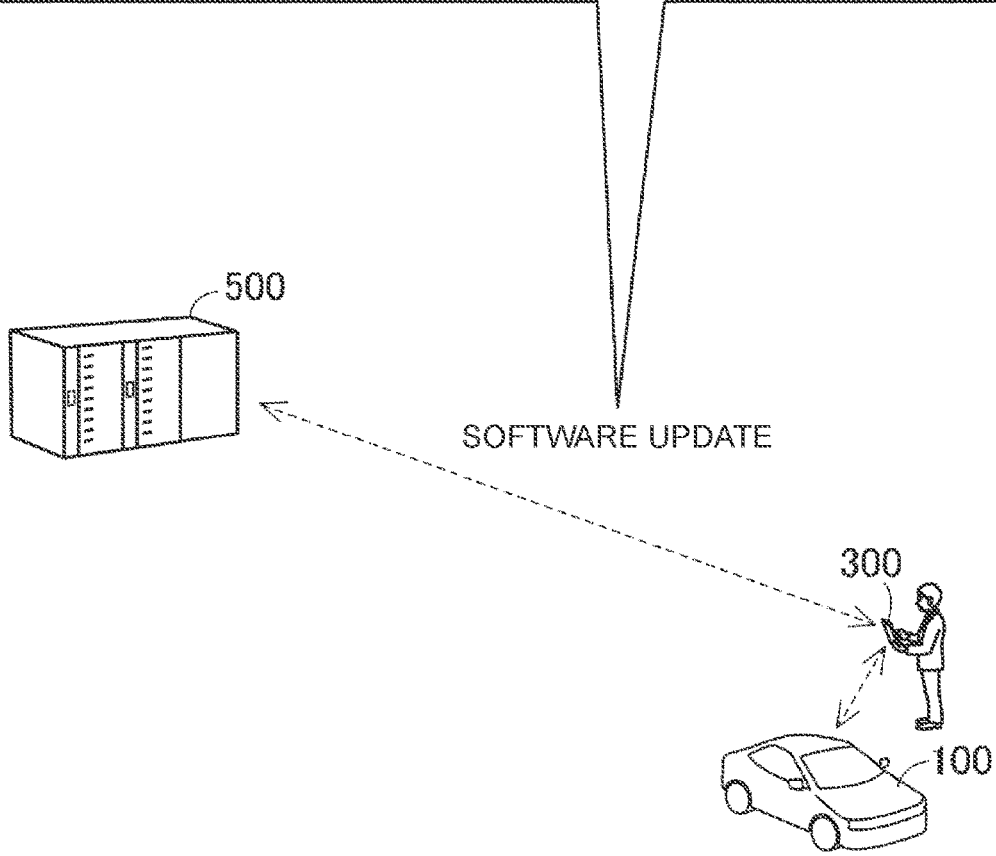

MOBILE EQUIPMENT AND SOFTWARE DISTRIBUTION SYSTEM

CROSS-REFERENCE TO RELATED APPLICATION

This application claims priority to Japanese Patent Application No. 2022-160958 filed on Oct. 5, 2022, incorporated herein by reference in its entirety.

BACKGROUND

1. Technical Field

The present disclosure relates to mobile equipment and software distribution systems.

2. Description of Related Art

Japanese Unexamined Patent Application Publication No. 2017-149323 (JP 2017-149323 A) discloses a technique of updating software on an electronic control unit (ECU) installed in a vehicle by Over-The-Air (OTA) technology.

SUMMARY

A vehicle can download new software for an in-vehicle ECU from an OTA center by wirelessly communicating with the OTA center. In the vehicle, the target ECU (ECU whose software is to be updated) then sequentially performs installation and activation of the downloaded software. A software update can thus be performed.

A typical in-vehicle ECU includes one or more microcomputers. Typical microcomputers in in-vehicle ECUs are roughly classified into a dual-bank microcomputer and a single-bank microcomputer.

In the dual-bank microcomputer, two banks are formed by two memories. In the dual-bank microcomputer, software can be restored (rolled back) to its original version if activation fails. Specifically, a new version of software is written to a write bank with the original version of the software remaining on an active bank. If activation on the write bank fails, rollback is performed using the original version of the software remaining on the active bank.

In the single-bank microcomputer, one bank is formed by one memory. In the single-bank microcomputer, software is overwritten in one bank. Therefore, the original version of the software does not remain in the bank. The single-bank microcomputer may have a problem that software cannot be restored (rolled back) to its original version if activation fails.

Possible solutions to this problem include: switching the single-bank microcomputer to a dual-bank microcomputer; providing a storage unit for rollback in the bank of the single-bank microcomputer; and providing the single-bank microcomputer with an external non-volatile memory (e.g., flash memory) for rollback. However, these design changes lead to a significant increase in cost of the in-vehicle ECU.

Currently popular vehicles are equipped with many single-bank microcomputers, and software updates on the single-bank microcomputers are often performed at dealerships (dealers). However, there is also a need for users of vehicles to easily perform software updates even on single-bank microcomputers by the OTA technology at their discretion.

The present disclosure provides mobile equipment and software distribution system that enable a suitable software update to be performed even on a single bank-type computer installed in a vehicle by the OTA technology.

Mobile equipment according to a first aspect of the present disclosure includes one or more first processors and a communication module. The one or more first processors are configured to control the communication module to receive update software for a single bank-type computer installed in a vehicle from a server. The one or more first processors are configured to control the communication module to acquire rollback data. The one or more first processors are configured to generate a package including the update software and the rollback data. The one or more first processors are configured to control the communication module to send the package to the vehicle.

The server may function as an OTA center that distributes software. The mobile equipment can mediate communication between the vehicle and the OTA center. In a system including the server, the vehicle, and the mobile equipment, the mobile equipment can add the rollback data to the update software received from the server. As described above, the mobile equipment sends the package including both the update software and the rollback data to the vehicle. This allows the vehicle to perform rollback using the rollback data when a software update on the single bank-type computer fails. A suitable software update can thus be performed even on the single bank-type computer installed in the vehicle by the OTA technology.

The mobile equipment is device that can be carried around by a user. Examples of the mobile equipment include a tablet, a smartphone, and a wearable device.

The mobile equipment according to the first aspect may have the following configuration.

In the mobile equipment according to the first aspect, the rollback data may include a difference file between the update software and pre-update software.

According to the above configuration, the vehicle can perform a software update using the update software, and can also perform rollback using the difference file.

In the mobile equipment according to the first aspect, the rollback data may include version information of pre-update software on the single bank-type computer.

According to the above configuration, the vehicle can acquire the pre-update software using the version information of the pre-update software. Therefore, rollback for the single bank-type computer can be properly performed.

The mobile equipment according to the first aspect may further include one or more memories. The one or more first processors may be configured to, in a software update on the single bank-type computer, suspend the software update until the one or more memories have enough free space to generate the package, and permit the software update on the single bank-type computer once the one or more memories have enough free space to generate the package.

According to the above configuration, a software update on the single bank-type computer can be easily properly performed.

In the mobile equipment according to the first aspect, the one or more first processors may be configured to give a predetermined notification when there is not enough free space in the one or more memories to generate the package during the software update on the single bank-type computer.

According to the above configuration, the user can easily grasp the situation. In the mobile equipment according to the first aspect, the communication module may be configured to acquire the update software from the server by wireless communication. The communication module may be configured to send the package to the vehicle by wireless communication.

According to the above configuration, user convenience is improved. The mobile equipment according to the first aspect may be a smartphone.

According to the above configuration, a system with high user convenience is implemented.

A software distribution system according to a second aspect of the present disclosure includes the mobile equipment according to the first aspect, the vehicle, and the server. The vehicle includes a control device including one or more second processors and configured to manage a software update sequence. The one or more second processors are configured to perform a software update on the single bank-type computer using the update software received from the mobile equipment, and when the software update fails, perform rollback using the rollback data.

According to the above software distribution system, the software update can be easily managed by the vehicle.

In the software distribution system according to the second aspect, the single bank-type computer may be a computer configured to control travel of the vehicle.

According to the above configuration, when an update of software related to travel control fails, the software can be restored (rolled back) to pre-update software. With the pre-update software, the vehicle can travel as before. Therefore, the user can feel at ease.

According to the present disclosure, a suitable software update can be performed even on a single bank-type computer installed in a vehicle by the OTA technology.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 illustrates an overview of a software update method according to the embodiment of the present disclosure;

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
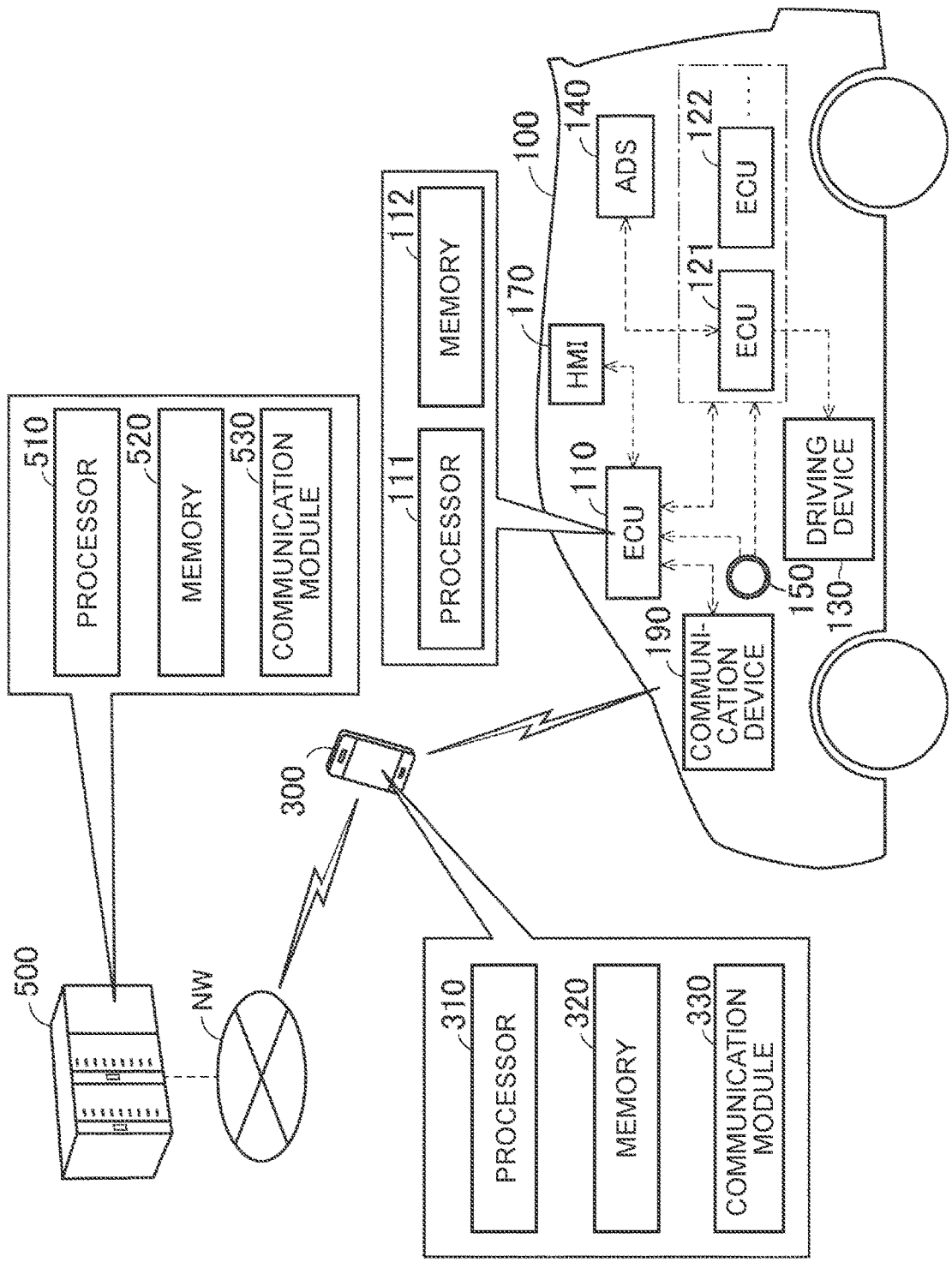
FIG. 1 shows a schematic configuration of a software distribution system according to an embodiment of the present disclosure.

FIG. 1 shows the configuration of a software distribution system according to the present embodiment. Referring to FIG. 1, the software distribution system includes a vehicle 100, mobile equipment 300, and an OTA center 500. "OTA" is an abbreviation for "Over The Air."

The vehicle 100 is a battery electric vehicle (BEV) without an internal combustion engine. The vehicle 100 according to the present embodiment does not have an OTA access function (function to wirelessly communicate directly with the OTA center 500), and cannot communicate with the OTA center 500 without via another communication device (i.e., a communication device different from that installed in the vehicle 100 itself). Specifically, the vehicle 100 wirelessly communicates with the OTA center 500 via the mobile equipment 300. The vehicle 100 is an example of a vehicle to which the software distribution system described below is applied, and the software distribution system may be applied to other vehicles.

The mobile equipment 300 is configured to be carried around by a user. The mobile equipment 300 is carried and operated by a user of the vehicle 100 (vehicle manager). In the present embodiment, a smartphone with a touch panel display is used as the mobile equipment 300. The smartphone contains a computer and has a speaker function. However, the mobile equipment 300 is not limited to this, and any device that can be carried by the user of the vehicle 100 can be used as the mobile equipment 300. For example, a laptop, a tablet, a portable gaming device, or a wearable device (such as a smartwatch, smart glasses, or smart gloves) can also be used as the mobile equipment 300.

The mobile equipment 300 includes a processor 310, a memory 320, and a communication module 330. The processor 310 includes, for example, a central processing unit (CPU). The memory 320 includes a non-volatile memory such as a flash memory. The communication module 330 includes a communication interface (I/F) for direct wireless communication with the OTA center 500. The communication module 330 also includes a communication I/F for direct wireless communication with the vehicle 100. The mobile equipment 300 mediates communication between the vehicle 100 and the OTA center 500. For example, the mobile equipment 300 specifies the address of the OTA center 500 and accesses a communication network NW in response to a request from the vehicle 100. The vehicle 100 (ECU 110) can thus communicate with the OTA center 500 via the mobile equipment 300 (communication module 330). Wireless communication is established between the vehicle 100 and the OTA center 500 in this manner.

Application software (hereinafter referred to as "mobile app") for using a service provided by the OTA center 500 is installed in the mobile equipment 300. Identification information (equipment identification (ID)) of the mobile equipment 300 is registered in the OTA center 500 in association with identification information (vehicle ID) of the vehicle 100 through the mobile app. The mobile equipment 300 can send and receive information to and from the OTA center 500 through the mobile app.

The OTA center 500 is a server that provides a vehicle software update service using the OTA technology. The OTA center 500 is configured to perform a software update on an in-vehicle ECU remotely from the OTA center 500 via a communication section. The OTA center 500 distributes software for the in-vehicle ECU. The term "ECU" means an electronic control unit.

The OTA center 500 includes a processor 510, a memory 520, and a communication module 530. The processor 510 includes, for example, a CPU. The memory 520 includes a non-volatile memory such as a flash memory. The communication module 530 is connected to the communication network NW by wire, and communicates with a plurality of pieces of mobile equipment (including the mobile equipment 300) via the communication network NW. The communication network NW is a wide area network formed by, for example, the Internet and wireless base stations. The communication network NW may include a mobile phone network.

Identification information (vehicle ID) of each vehicle (including the vehicle 100) that receives the vehicle software update service from the OTA center 500 is registered in advance in the OTA center 500. A storage device (e.g., the memory 520) of the OTA center 500 stores information on each vehicle (hereinafter also referred to as "vehicle information") in association with the vehicle ID. The vehicle information includes, for example, specifications of each vehicle and a communication address of each vehicle (for the vehicle 100, a communication address of the mobile equipment 300).

The vehicle 100 includes a plurality of ECUs (including ECUs 110, 121, and 122). The vehicle 100 may include any number of ECUs. Each in-vehicle ECU contains a computer that includes at least one processor and at least one memory. Each in-vehicle ECU may include a plurality of microcomputers in the form of, for example, a main microcomputer and a sub-microcomputer. In the vehicle 100, the ECUs are connected to each other via a communication bus, and are configured to communicate with each other by wire. The method for communication between the ECUs may be, for example, but is not particularly limited to, a Controller Area Network (CAN) or Ethernet (registered trademark).

The ECU 110 includes a processor 111 and a memory 112. The processor 111 includes, for example, a CPU. The memory 112 includes a non-volatile memory such as a flash memory. The vehicle 100 further includes a communication device 190. The ECU 110 communicates with devices outside the vehicle 100 through the communication device 190. The communication device 190 includes a communication OF for direct wireless communication with the mobile equipment 300. The communication device 190 and the mobile equipment 300 may perform short-range communication by, for example, a wireless local area network (LAN), near field communication (NFC), or Bluetooth (registered trademark). The communication device 190 may communicate directly with the mobile equipment 300 that is present inside the vehicle 100 or within a range around the vehicle 100. The mobile equipment 300 that is present inside or outside the vehicle 100 and the ECU 110 may send and receive information to and from each other via the communication device 190 while the vehicle 100 is at a complete stop. The mobile equipment 300 that is present inside the vehicle 100 and the ECU 110 may send and receive information to and from each other via the communication device 190 while the vehicle 100 is traveling. The ECU 110 can communicate with the OTA center 500 via the mobile equipment 300 by requesting the mobile equipment 300 to communicate with the OTA center 500 as described above.

As described above, the ECU 110 of the vehicle 100 is configured to wirelessly communicate with the OTA center 500 via the mobile equipment 300. The vehicle 100 can communicate with the OTA center 500 both while the vehicle 100 is at a complete stop and while the vehicle 100 is traveling. The ECU 110 manages in-vehicle information, receives a campaign, and manages a software update sequence. The method for communication between the vehicle 100 and the mobile equipment 300 is not limited to the short-range communication. The vehicle 100 and the mobile equipment 300 may be configured to communicate with each other even when they are remote from each other. The communication device 190 may further include a communication OF for wired communication with a scan tool, not shown (dedicated tool for wired software updates). The ECU 110 may communicate by wire with the scan tool connected to an in-vehicle data link connector (DLC), not shown, via the communication device 190.

The vehicle 100 is an autonomous vehicle configured to perform automated driving. More specifically, the vehicle 100 is configured to perform both manned travel and unmanned travel. Although the vehicle 100 is configured to perform unmanned autonomous travel, the vehicle 100 can also be manually driven by the user (manned travel). The vehicle 100 can also perform automated driving (e.g., auto cruise control) during manned travel. The level of automated driving may be fully automated driving (level 5), or may be conditional automated driving (e.g., level 4).

The vehicle 100 further includes a driving device 130 and an autonomous driving system (ADS) 140. In the vehicle 100, the ECU 121 is configured to control the driving device 130.

The driving device 130 includes an accelerator device, a brake device, and a steering device. The accelerator device includes, for example, a motor generator (hereinafter referred to as "MG") that rotates drive wheels of the vehicle, a power control unit (PCU) that drives the MG, and a battery that supplies electric power for driving the MG to the PCU. The MG functions as a travel motor for the vehicle. The brake device includes, for example, a braking device provided for each of the wheels of the vehicle, and an actuator that drives the braking device. The steering device includes, for example, an electric power steering system (EPS) and an actuator that drives the EPS.

The ADS 140 includes a perception sensor that perceives the surroundings of the vehicle 100 (e.g., at least one of the following sensors: a camera, a millimeter wave radar, and a Light Detection and Ranging (LiDAR) sensor). The ADS 140 performs a process related to automated driving, based on information sequentially acquired by the perception sensor. Specifically, the ADS 140 cooperates with the ECU 121 to generate a travel plan (information indicating the future behavior of the vehicle 100) according to the surroundings of the vehicle 100. The ADS 140 then requests the ECU 121 to control various actuators in the driving device 130 to cause the vehicle 100 to travel according to the travel plan.

In the present embodiment, the vehicle contains the ADS. However, the ADS is not limited to this, and may be an automated driving kit that can be removably mounted on the vehicle. A sensor unit (including the perception sensor) of the automated driving kit may be attached to a rooftop of the vehicle.

The vehicle 100 further includes a start switch 150 and a human-machine interface (HMI) 170.

The start switch 150 is a switch for the user to start a vehicle system (control system of the vehicle 100), and is installed in, for example, a vehicle cabin. The start switch is commonly referred to as "power switch" or "ignition switch." The vehicle system (including each ECU of the vehicle 100) is switched between on (activated) and off (deactivated) when the user operates the start switch 150. When the start switch 150 is turned on, the vehicle system in the deactivated state is started and switched to the activated state (hereinafter also referred to as "IG-ON"). When the start switch 150 is turned off while the vehicle system is in the activated state, the vehicle system is switched the deactivated state (hereinafter also referred to as "IG-OFF").

The operation to turn on the start switch 150 is an operation to switch the state of the vehicle from IG-OFF to IG-ON. When the user turns on the start switch 150, a start request is input to each in-vehicle ECU. That is, each in-vehicle ECU receives the start request from the user. The operation to turn off the start switch 150 is an operation to switch the state of the vehicle from IG-ON to IG-OFF. When the user turns off the start switch 150, a shutdown request is input to each in-vehicle ECU, and the vehicle 100 waits for shutdown. Each in-vehicle ECU thus receives the shutdown request from the user. The operation to turn off the start switch 150 is prohibited while the vehicle 100 is traveling.

The HMI 170 includes an input device and a display device. The HMI 170 may include a touch panel display that functions as the input device and the display device. The HMI 170 may include an information display or a telltale as the display device. The HMI 170 may include a steering switch as the input device. At least one of the following may serve as the HMI 170: an in-vehicle infotainment (IVI) system, an instrument panel, and a head-up display. The HMI 170 may include an input device and display device of a car navigation system.

FIG. 2 illustrates an overview of a software update method according to the present embodiment. Referring to FIG. 2 together with FIG. 1, a process related to software update (more specifically, update of vehicle software using the OTA technology) is performed according to a procedure including configuration synchronization, campaign notification and acceptance of application, download, installation, activation, and software update completion notification. The process described below is performed by the OTA center 500 and each vehicle (including the vehicle 100) that receives software distribution from the OTA center 500. The number of vehicles that receive distribution from the OTA center 500 may be about 50, may be 100 or more and less than 1000, or may be 1000 or more.

The vehicle 100 in the IG-ON state repeats the configuration synchronization every preset time period. The vehicle 100 in the IG-ON state also performs the configuration synchronization when it receives a request for configuration synchronization from the OTA center 500. The process of configuration synchronization by the vehicle 100 (ECU 110) includes sending vehicle configuration information to the OTA center 500. The vehicle configuration information includes, for example, hardware information (information indicating product numbers of hardware, identifiers of the ECUs, etc.) and software information (information indicating product numbers of software etc.) of the individual ECUs in the vehicle 100. In the present embodiment, the vehicle configuration information further includes an RX Software Identification Number (RXSWIN) for each type approved system. The RXSWIN is an identification number that can identify software on the type approved system.

When the OTA center 500 receives the vehicle configuration information from the vehicle 100, the OTA center 500 checks for any currently available campaign (software update). When there is any campaign that is applicable to the vehicle 100, the OTA center 500 sends an accept request signal that requests the user of the vehicle 100 to accept download of new software (updated version of software) related to that campaign. The accept request signal includes information on the campaign (campaign information). The campaign information may include, for example, at least one of the following pieces of information: campaign attribute information (information indicating the purpose of the software update, the function(s) of the vehicle 100 that can be affected by the update, etc.), a list of vehicles eligible for the campaign, information on ECUs eligible for the campaign (e.g., software information before and after the update), and information on notifications to be sent to the user before and after the update. The campaign to be notified may be a newly available campaign or may be a campaign that was not previously applied. Hereinafter, sending of the accept request signal will also be referred to as "campaign notification."

When the vehicle 100 receives a campaign notification (accept request signal), the vehicle 100 requests the user to enter whether to accept to apply the campaign to the vehicle 100. Specifically, the vehicle 100 displays a message such as "New software is available. Do you want to apply this software to this vehicle?" on the in-vehicle HMI (e.g., HMI 170) to request the user to enter an input indicating either "accept" or "decline." When the user enters an input indicating "accept" to the in-vehicle HMI, the vehicle 100 performs a process related to download that will be described below. When the user enters an input indicating "decline" to the in-vehicle HMI, the vehicle 100 does not perform the process related to download. In this case, the OTA center 500 ends the process related to software update without proceeding to the download phase.

In the present embodiment, the OTA center 500 and the vehicle 100 (ECU 110) perform the process related to download according to the following procedure.

The ECU 110 of the vehicle 100 requests the mobile equipment 300 to send a distribution package including new software for each update target. One or more microcomputers included in a target ECU (ECU whose software is to be updated) are update targets. For example, the target ECU may be the ECU 121, and the software to be updated may be an automated driving control program. The distribution package may further include package attribute information (information indicating the update category, the number of pieces of update data in the distribution package, the order of installation in each ECU, etc.), and update data attribute information (identifier of the target ECU, verification data for verifying the validity of the update data, etc.).

In response to the request for a distribution package from the vehicle 100, the mobile equipment 300 sends a distribution package including new software to the vehicle 100. The mobile equipment 300 may combine pieces of update software into one distribution package and send the one distribution package including new software for all the update targets to the vehicle 100. Alternatively, the mobile equipment 300 may generate for each update target a distribution package including new software for the update target, and send the distribution packages to the vehicle 100 one by one. As will be described later, in the case where the update target includes a single bank-type computer, the mobile equipment 300 generates for the single bank-type computer a package including new software and rollback data (hereinafter also referred to as "RB package") in response to the request for a distribution package. The mobile equipment 300 sends a distribution package including the generated RB package to the vehicle 100. The ECU 110 downloads (receives and saves) the distribution package while wirelessly communicating with the OTA center 500 via the mobile equipment 300.

The distribution package is saved in a storage device (e.g. the memory 112) of the ECU 110 through the process related to download described above. During the download, the in-vehicle HMI informs the user of the progress of the download. After the download is completed, the ECU 110 verifies the authenticity of the downloaded distribution package. When the verification result is "normal," the ECU 110 notifies the OTA center 500 of the software update status (completion of the download) via the mobile equipment 300. This notification means that the download was successful.

After the successful download, the vehicle 100 performs installation. Specifically, the ECU 110 requests the target ECU (e.g. the ECU 121) to output the state of the target ECU and a diagnostic trouble code (DTC). The ECU 110 determines for each target ECU whether installation can be performed, based on the state of the target ECU and the DTC. The ECU 110 then transfers the new software (update data) to the target ECU for which installation can be performed. When the target ECU receives the update data, the target ECU installs the received update data (writes the received update data to a non-volatile memory). During the installation, the in-vehicle HMI informs the user of the progress of the installation.

When the transfer of the update data from the ECU 110 to the target ECU is completed, the target ECU sends a transfer completion notification to the ECU 110. When the ECU 110 receives the transfer completion notification, the ECU 110 requests the target ECU to perform integrity verification. In response to this request, the target ECU performs verification using integrity verification data (verification data), and sends the verification result to the ECU 110. The ECU 110 saves the verification result (whether the installation was completed, failed, or was cancelled) from each target ECU. When the integrity verification is completed by all the target ECUs and the verification results from all the target ECUs are "normal," the ECU 110 notifies the OTA center 500 of the software update status (completion of the installation) via the mobile equipment 300. This notification means that the installation was successful.

After the installation is successfully performed following the successful download, the vehicle 100 waits for activation. When the start switch 150 of the vehicle 100 is subsequently turned off, the ECU 110 displays an activation accept screen on the in-vehicle HMI to request the user to enter an input indicating either "accept" or "decline." The activation accept screen may display restrictions on the vehicle 100 (e.g., the vehicle 100 will not be available for use for a certain period of time, or the operation of overcurrent devices will be restricted). The activation accept screen may request the user to keep the vehicle 100 in a non-traveling state (e.g., keep the vehicle 100 waiting for shutdown, keep the vehicle 100 in the park (P) range, or keep the electric parking brake engaged) until the activation is completed. The activation accept screen may display a message prompting the user to check the state of the vehicle 100.

When the user enters an input indicating "accept" on the activation accept screen, the ECU 110 request each target ECU to perform activation (activation of the installed software). When the user enters an input indicating "decline" on the activation accept screen, the ECU 110 cancels the process related to software update without performing activation, and the vehicle system is shut down.

Each target ECU performs activation in response to the request from the ECU 110. In a target ECU including a plurality of microcomputers (e.g., a main microcomputer and a sub-microcomputer), the sub-microcomputer in the target ECU may perform rewriting using a flash rewrite function of the main microcomputer in the target ECU. Alternatively, each microcomputer in the target ECU may perform rewriting by communicating directly with the ECU 110.

Each target ECU notifies the ECU 110 of the activation result (successful or failed). As will be described in detail later, the software is rolled back when the activation in the target ECU fails. When the activation in the target ECU is successful, all the microcomputers (update targets) in the target ECU are synchronously reset and booted (self-reset) to launch the updated software as soon as rewriting is completed in these microcomputers. The target ECU waits for a shutdown request from the ECU 110 after the self-reset is completed. The target ECU in this state can continue diagnosis communication with the ECU 110.

When the ECU 110 receives a notification on the successful activation from the target ECU, the ECU 110 requests identification information of the updated software (ECU software ID) from the target ECU. The ECU 110 checks whether the identification information received from the target ECU matches identification information of the updated software in the campaign information (configuration verification). When the configuration verification is successful (i.e., the above pieces of software identification information match each other), the ECU 110 updates the RXSWIN. The RXSWIN being updated means that the activation was successful.

When all the target ECUs have successfully performed the activation, the ECU 110 notifies the OTA center 500 of the software update status (completion of the software update) via the mobile equipment 300. This notification means that the OTA software update was successful. The ECU 110 may display the result of the software update on the in-vehicle HMI. The in-vehicle HMI displays, for example, a software update completion screen indicating that the update was successful. After sending the notification on the completion of the software update, the ECU 110 sends a shutdown request to each target ECU, and the control system of the vehicle 100 is shut down. The vehicle 100 is thus switched to IG-OFF. When the start switch 150 of the vehicle 100 is subsequently turned on, the vehicle system is switched to IG-ON. An update program (new version of the software) is thus started on the target ECU. The software to be updated is not limited to a control program for a driver assistance system such as the automated driving control program, and may be any software. For example, the OTA center 500 may distribute software related to entertainment.

Typical microcomputers in in-vehicle ECUs are roughly classified into a dual-bank microcomputer (dual bank-type microcomputer) and a single-bank microcomputer (single bank-type microcomputer). In the dual-bank microcomputer, new software (new version of software) is written to a write bank with old software (original version of software) remaining on an active bank. Therefore, if activation fails, the software on the write bank can be restored (rolled back) to the old software by using the old software remaining on the active bank. In the single-bank microcomputer, on the other hand, software is overwritten in one bank. Therefore, old software does not remain. The single-bank microcomputer may have a problem that the software cannot be restored (rolled back) to the old software if activation fails.

In view of this, the software distribution system according to the present embodiment performs processes shown in FIGS. 3 and 4 described below so that a suitable software update can be performed even on a single bank-type computer installed in the vehicle by the OTA technology.

In the software distribution system according to the present embodiment, a microcomputer that is an update target (microcomputer whose software is to be updated) is either or both of a single-bank microcomputer and a dual-bank microcomputer in a target ECU. In the vehicle 100, the ECU 121 contains a single-bank microcomputer and the ECU 122 contains a dual-bank microcomputer, as will be described in detail later. In the case where activation for the update target in the target ECU fails, rollback is performed for the update target. In particular, a plurality of microcomputers that cooperates with each other to perform control is required to have the same version of software. Software is upgraded (software update is performed) simultaneously in these microcomputers. When activation fails in any of these microcomputers, a process of restoring the software to old software (rollback process) is performed for all of the microcomputers.

Figure 3:
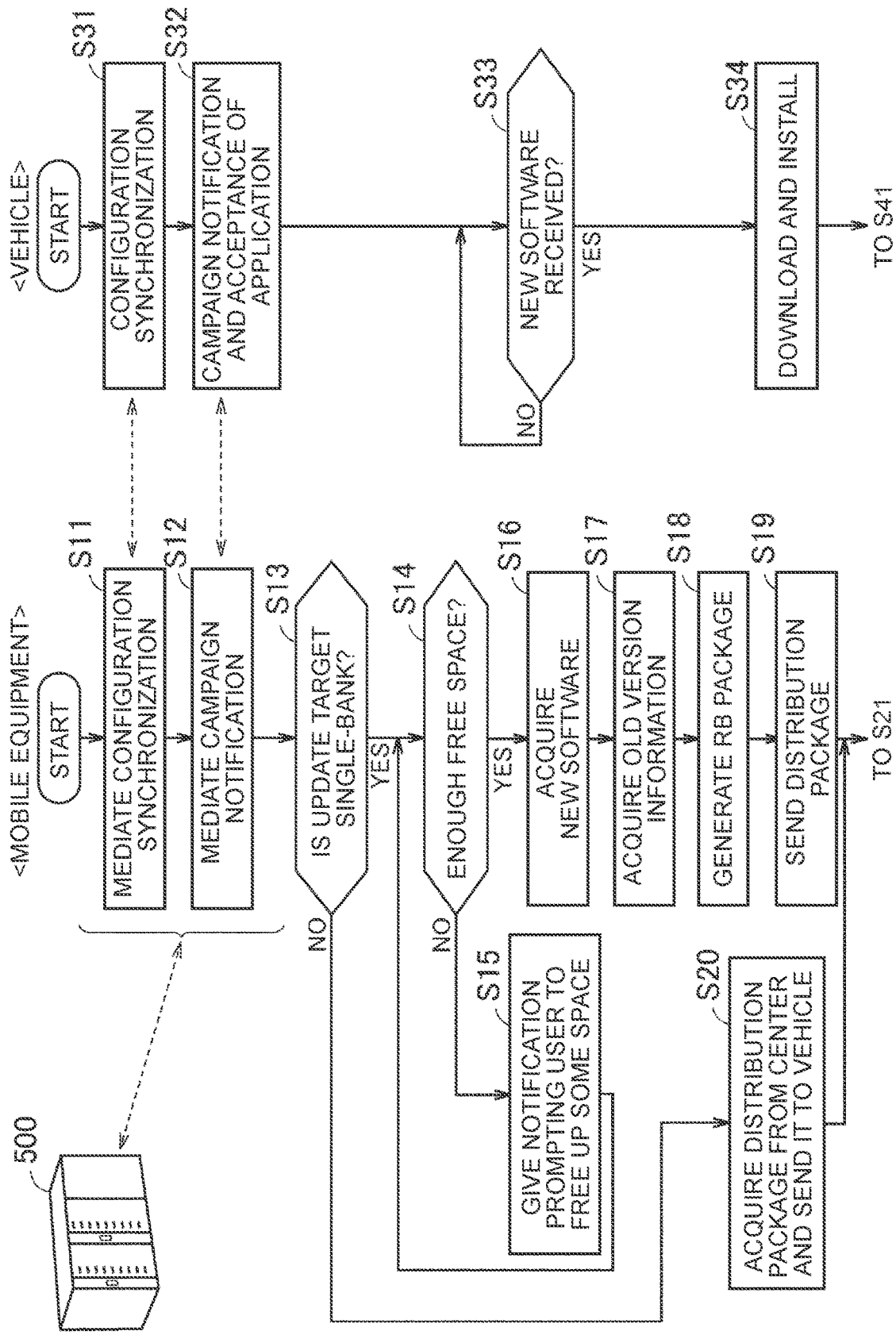
FIG. 3 is a first flowchart showing the procedure of the software update method according to the embodiment of the present disclosure.

FIG. 3 is a first flowchart showing the procedure of the software update method according to the present embodiment. A series of steps shown in this flowchart is performed by the mobile equipment 300 and the vehicle 100 when the time to perform the configuration synchronization comes (e.g., when a condition to perform the configuration synchronization is satisfied). In the present embodiment, the processor 310 shown in FIG. 1 functions as an example of a "reception unit," an "acquisition unit," a "generation unit," an "update unit," a "notification unit," and a "transmission unit" according to the present disclosure, and the memory 320 shown in FIG. 1 functions as an example of a "storage unit" according to the present disclosure. "S" in the flowchart means a step. The following process in the flowchart is implemented by one or more processors reading and executing a program stored in one or more memories.

Referring to FIG. 3 together with FIGS. 1 and 2, a series of steps S11 to S20 is performed by the mobile equipment 300. A series of steps S31 to S34 is performed by the vehicle 100. In S31, the ECU 110 performs the configuration synchronization (FIG. 2) via the mobile equipment 300. In S11, the mobile equipment 300 mediates the configuration synchronization between the vehicle 100 and the OTA center 500. When there is a campaign applicable to the vehicle 100, the ECU 110 receives a campaign notification (FIG. 2) from the OTA center 500 via the mobile equipment 300 in S32. In S12, the mobile equipment 300 mediates the campaign notification from the OTA center 500 to the vehicle 100. When the user enters an input indicating "accept" on the in-vehicle HMI about application of the campaign, the process proceeds to S13 and S33. The series of steps shown in FIG. 3 ends when there is no campaign applicable to the vehicle 100 and when the user enters an input indicating "decline" about application of the campaign. The series of steps shown in FIG. 3 is started again when the time to perform the configuration synchronization comes.

In S13, the mobile equipment 300 determines whether an update target (computer whose software is to be updated) is a single-bank microcomputer. The update target is a microcomputer in a target ECU. The mobile equipment 300 may acquire information on the update target from the vehicle 100 (ECU 110). Alternatively, the mobile equipment 300 may extract information on the update target from campaign information (S12). When the update target is a single-bank microcomputer (YES in S13), the mobile equipment 300 checks how much free space there is in the memory 320 and determines whether there is enough free space in the memory 320 to generate an RB package (see S18 described below) in S14. The mobile equipment 300 may acquire the data size of new software for the update target from the OTA center 500. Alternatively, the mobile equipment 300 may extract information on the new software from the campaign information (S12).

When there is enough free space in the memory 320 to generate an RB package (YES in S14), the process proceeds to S16. When there is not enough free space in the memory 320 to generate an RB package (NO in S14), the mobile equipment 300 gives a predetermined notification in S15. Specifically, the mobile equipment 300 displays a message prompting the user to free up some space in the memory 320. The user can increase the free space in the memory 320 by operating the mobile equipment 300 to stop any unnecessary apps running on the mobile equipment 300 or delete any unnecessary data stored in the memory 320. As long as there is not enough free space in the memory 320 to generate an RB package (NO in S14), S14 and S15 are repeated and the mobile equipment 300 keeps giving the above notification. After the user increases the free space in the memory 320 sufficiently in response to the message (request to free up some space) (YES in S14), the process proceeds to S16.

In S16, the mobile equipment 300 acquires the new software for the update target (new version of the software body) from the OTA center 500 by wireless communication. Thereafter, in S17, the mobile equipment 300 acquires version information of old software on the update target (information indicating the version of pre-update software). The mobile equipment 300 may acquire the version information of the old software on the update target from the vehicle 100. Alternatively, the mobile equipment 300 may extract the version information of the old software on the update target from the campaign information (S12).

Subsequently, in S18, the mobile equipment 300 generates an RB package including the new software for the update target (update software) and the version information of the old software on the update target (rollback data). The mobile equipment 300 may add the version information of the old software to the new software to generate one package. Subsequently, in S19, the mobile equipment 300 sends a distribution package including the RB package (S18) to the vehicle 100 by wireless communication.

When the update target is not a single-bank microcomputer (NO in S13), the mobile equipment 300 receives a distribution package including the new software for the update target (new version of the software body) from the OTA center 500 by wireless communication and sends the received new software to the vehicle 100 by wireless communication in S20.

After receiving the input indicating "accept" from the user, the vehicle 100 (ECU 110) waits for the distribution package from the mobile equipment 300 in S33. When NO in S33, the process does not proceed. Whether the vehicle 100 has received the distribution package from the mobile equipment 300 is repeatedly determined in S33 as long as the determination result in S33 is NO. When the vehicle 100 has received the distribution package from the mobile equipment 300 (YES in S33), the ECU 110 downloads and installs the new software for the update target (FIG. 2) in S34.

When the update target includes a plurality of microcomputers (computers), S13 to S20 and S33, S34 are performed for each update target. When the update target is a single-bank microcomputer (YES in S13), the mobile equipment 300 generates an RB package for the update target by S16 to S18 as described above, and then sends a distribution package including the RB package to the vehicle 100 in S19. On the other hand, when the update target is a dual-bank microcomputer (NO in S13), S16 to S18 will not be performed, and the mobile equipment 300 sends a distribution package that does not include rollback data to the vehicle 100 in S20.

Figure 4:
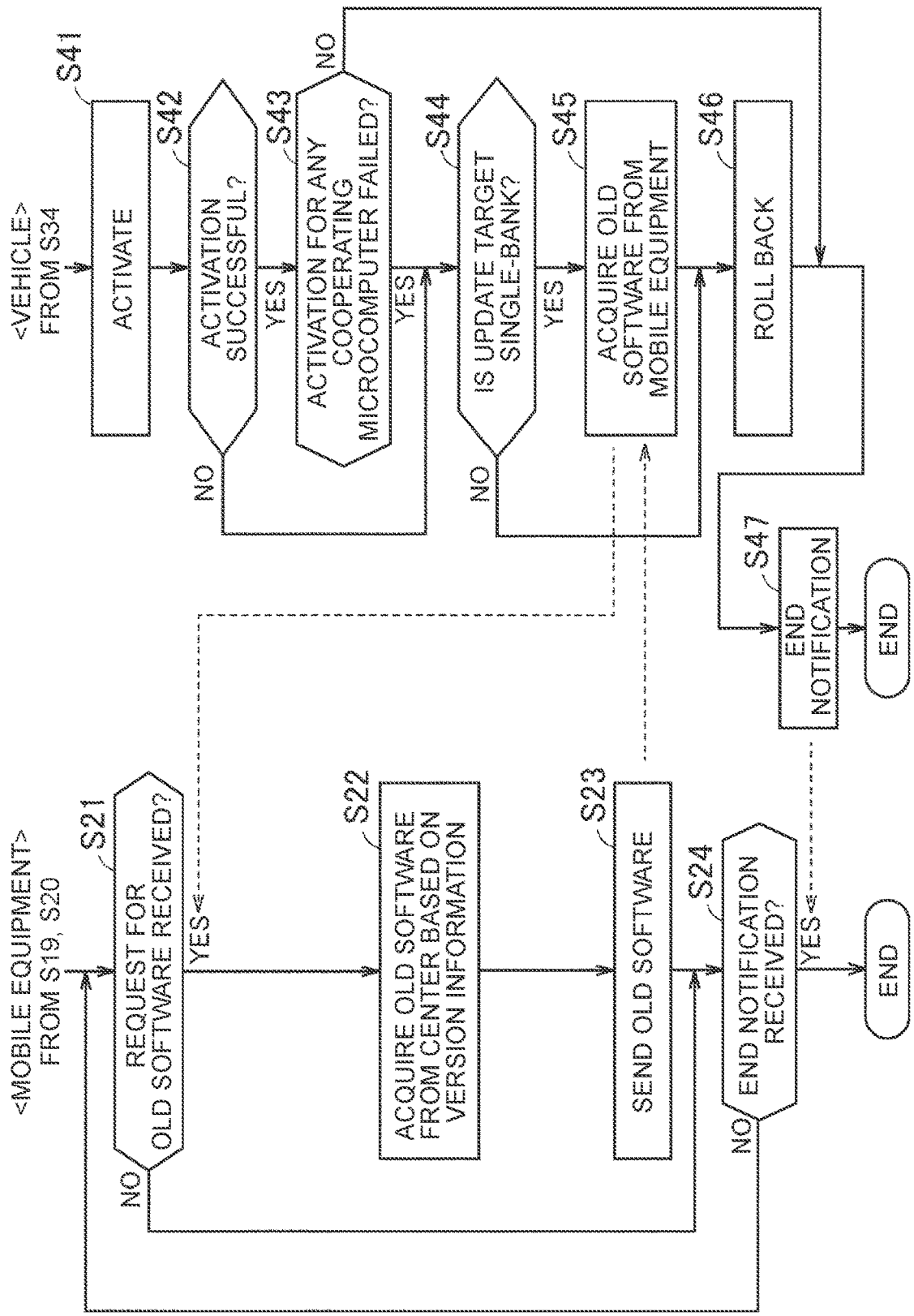
FIG. 4 is a second flowchart showing the procedure of the software update method according to the embodiment of the present disclosure.

When a predetermined condition to start activation is satisfied after download and installation of new software are completed for all the update targets, the process proceeds to S21 and S41 in FIG. 4. For example, when the condition to start activation is satisfied, the ECU 110 requests each target ECU to perform activation. A series of steps shown in FIG. 4 described below is then started. FIG. 4 is a second flowchart showing the procedure of the software update method according to the present embodiment.

Referring to FIG. 4 together with FIGS. 1 and 2, the target ECU of the vehicle 100 performs activation for the update target (FIG. 2) in S41 in response to the request from the ECU 110. For example, the ECU 110 determines whether the vehicle 100 is ready for activation. When it is determined that the vehicle 100 is ready for activation (e.g., the vehicle 100 is waiting for shutdown), the ECU 110 requests the target ECU to perform activation for the update target.

Thereafter, in S42, the target ECU determines whether the activation for the update target is successful. When the activation for the update target fails (NO in S42), the target ECU notifies the ECU 110 of the failure of the activation. When the ECU 110 receives the notification, the ECU 110 requests the target ECU to perform rollback for the update target. The ECU 110 also requests an ECU including a microcomputer that cooperates with the update target (i.e., a microcomputer that operates with the same version of software as that of the update target) to perform rollback for the microcomputer. The process then proceeds to S44.

When the activation for the update target is successful (YES in S42), the target ECU further determines in S43 whether activation for any microcomputer that cooperates with the update target failed. The target ECU may determine whether activation for any microcomputer that cooperates with the update target failed based on whether there is the rollback request from the ECU 110. When activation for any microcomputer that cooperates with the update target failed (YES in S43), the process proceeds to S44.

In S44, the target ECU determines whether the update target is a single-bank microcomputer. When the update target is a single-bank microcomputer (YES in S44), the vehicle 100 (target ECU) sends a signal requesting the old software (body) for the update target (hereinafter referred to as "SW request signal") to the mobile equipment 300 in S45. The SW request signal includes the version information of the old software on the update target (rollback data) included in the RB package.

After the download described above is completed, the mobile equipment 300 waits for the SW request signal from the vehicle 100 in S21. Specifically, the mobile equipment 300 determines in S21 whether the mobile equipment 300 has received the SW request signal from the vehicle 100 within a predetermined period of time after the completion of the download. When YES in S44, the vehicle 100 sends the SW request signal to the mobile equipment 300 before the predetermined period of time elapses. Therefore, the determination result in S21 is YES, and the process proceeds to S22. When NO in S44, the predetermined period of time elapses without the vehicle 100 sending the SW request signal. Therefore, the determination result in S21 is NO. In this case, S22 and S23 will not be performed, and the process proceeds to S24.

In S22, the mobile equipment 300 acquires the old software (body) for the update target from the OTA center 500 based on the version information of the old software on the update target (rollback data) indicated by the SW request signal. Thereafter, the mobile equipment 300 sends the old software (body) for the update target acquired from the OTA center 500 to the vehicle 100 (target ECU) in S23. The process then proceeds to S24.

When the update target is a single-bank microcomputer (YES in S44), the vehicle 100 receives the old software for the update target (S23) in S45. The target ECU of the vehicle 100 thus performs a rollback process for the update target (process of restoring the software on the update target to the old software) in S46 by using the old software (body) for the update target received from the mobile equipment 300. The target ECU receives the old software (body) for the update target from the mobile equipment 300, and restores the bank (single bank) of the update target to the state before the update by using the received old software (body).

When the update target is a dual-bank microcomputer (NO in S44), the vehicle 100 does not receive the old software for the update target (S23) from the mobile equipment 300, and the target ECU of the vehicle 100 performs the rollback process for the update target in S46.

Figure 5:
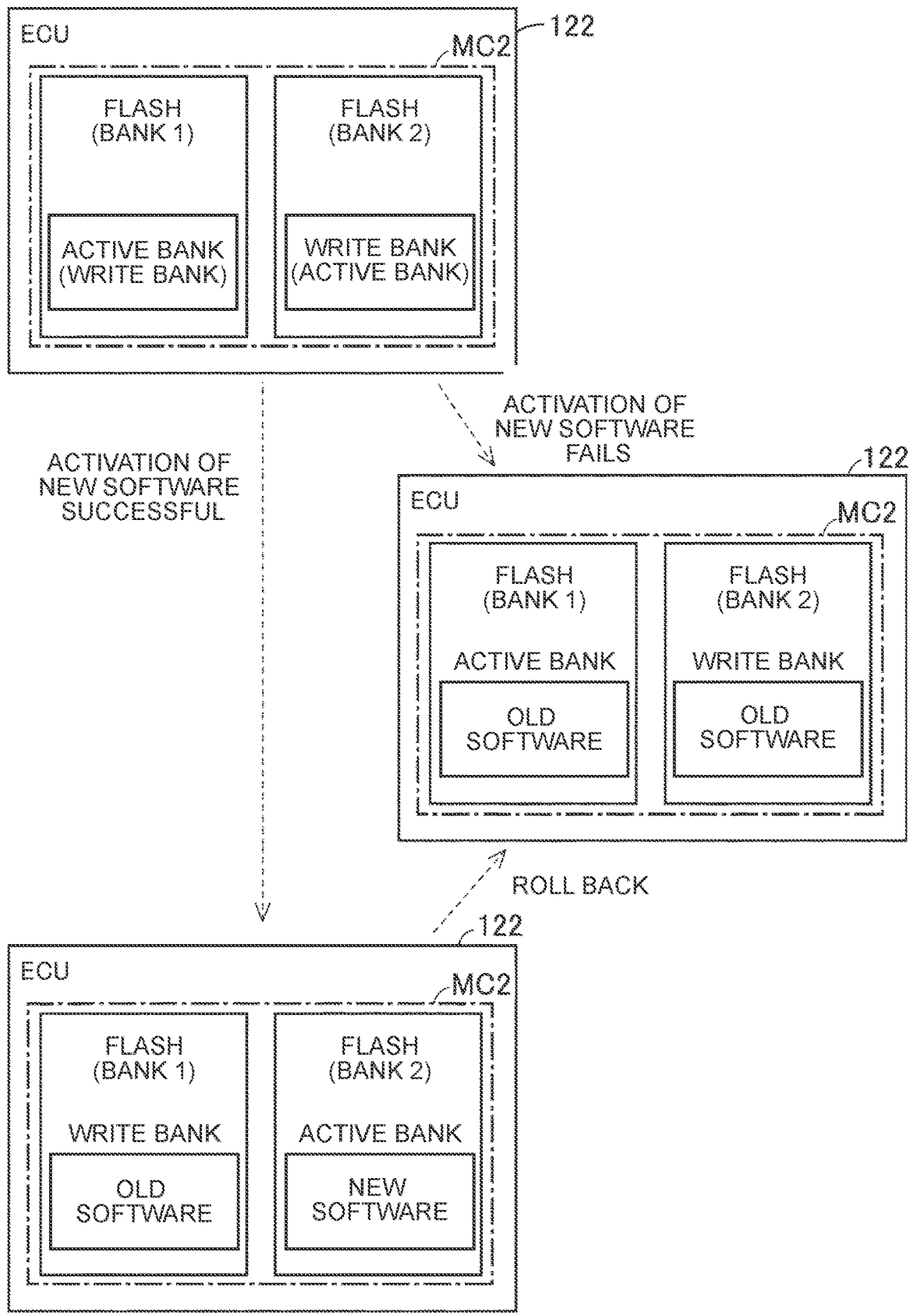
FIG. 5 illustrates particularly an activation (rollback) process for a dual-bank microcomputer in a target ECU in the process shown in FIG. 4.

FIG. 5 illustrates an activation (rollback) process for the dual-bank microcomputer in the ECU 122. An example will be described in which the ECU 122 is a target ECU and a dual-bank microcomputer MC2 is an update target.

Referring to FIG. 5, the ECU 122 includes the dual-bank microcomputer MC2 with two banks (first bank and second bank). Specifically, the dual-bank microcomputer MC2 includes two memories (e.g., flash memories), and each memory forms a bank in the microcomputer. For example, when the first bank serves as an active bank, the second bank serves as a write bank. The active bank (first bank) stores old software. New software is written to the write bank (second bank) by the download process and installation process described above (S34 in FIG. 3). The ECU 122 (target ECU) then switches the write bank of the dual-bank microcomputer MC2 to an active bank (activation) in S41 of FIG. 4. When the ECU 122 successfully performs the activation for the dual-bank microcomputer MC2 and does not receive a rollback request from the ECU 110, the ECU 122 waits for a shutdown request from the ECU 110 after performing self-reset. In this case, the first bank storing the old software serves as a write bank, and the second bank to which the new software has been written serves as an active bank. That is, the dual-bank microcomputer MC2 is started with the new software (updated program). On the other hand, when the ECU 122 receives a rollback request from the ECU 110, the ECU 122 performs the rollback process for the dual-bank microcomputer MC2 (S46 in FIG. 4). In this case, the first bank storing the old software is switched back to an active bank, and the second bank serves as a write bank. The old software is written to the write bank. The dual-bank microcomputer MC2 is started with the old software (pre-update program).

Figure 6:
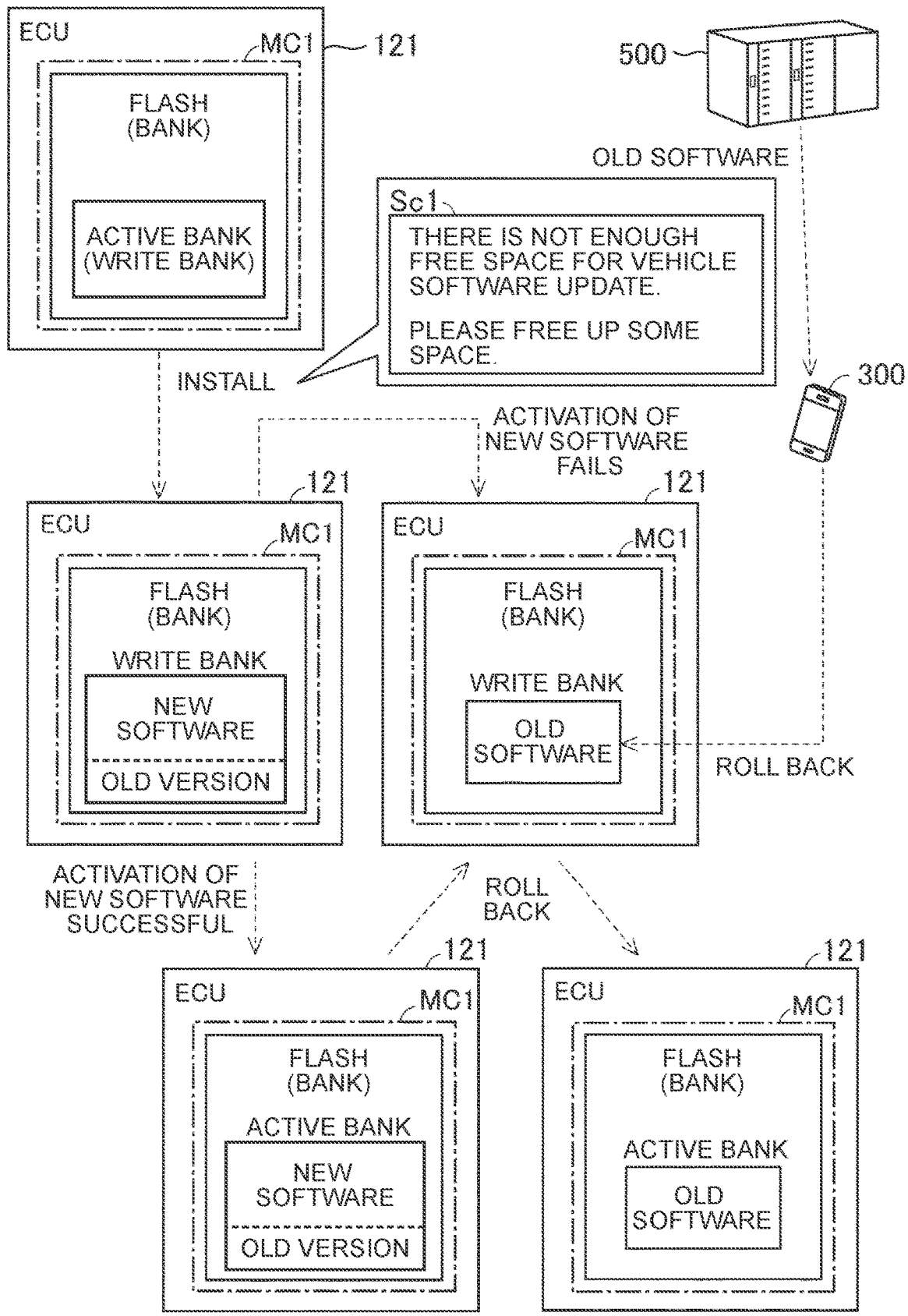
FIG. 6 illustrates particularly an activation (rollback) process for a single-bank microcomputer in a target ECU in the process shown in FIG. 4.

FIG. 6 illustrates an activation (rollback) process for the single-bank microcomputer in the ECU 121. An example will be described in which the ECU 121 is a target ECU and a single-bank microcomputer MC1 is an update target.

Referring to FIG. 6, the ECU 121 includes the single-bank microcomputer MC1 with one bank (single bank). Specifically, the single-bank microcomputer MC1 includes one memory (e.g., flash memory), and the memory forms a bank in the microcomputer. The single-bank microcomputer MC1 is a computer that controls travel of the vehicle 100. For example, the bank serves as an active bank during normal operation. Before a software update, the bank stores old software. The bank serves as a write bank during the software update. New software is written to the bank by the download process and installation process described above (S34 in FIG. 3). In the present embodiment, the mobile equipment 300 generates an RB package and sends a distribution package including the RB package to the vehicle 100 before the new software is written (S16 to S19 in FIG. 3). When there is not enough free space in the memory 320, the mobile equipment 300 prompts the user to free up some space in the memory 320 by displaying, for example, a screen Sc1 before generating the RB package (S15 in FIG. 3).

Old version information (version information of the old software) is written in succession to the new software to the write bank of the single-bank microcomputer MC1. The ECU 121 (target ECU) then switches the write bank of the single-bank microcomputer MC1 to an active bank (activation) in S41 of FIG. 4. When the ECU 121 successfully performs the activation for the single-bank microcomputer MC1 and does not receive a rollback request from the ECU 110, the ECU 121 waits for a shutdown request from the ECU 110 after performing self-reset. In this case, the bank to which the new software has been written serves as an active bank. That is, the single-bank microcomputer MC1 is started with the new software (updated program).

On the other hand, when the ECU 121 receives a rollback request from the ECU 110, the ECU 121 performs the rollback process for the single-bank microcomputer MC1 (S44 to S46 in FIG. 4). Specifically, the ECU 121 specifies the version and requests the old software from the mobile equipment 300 (S45 in FIG. 4). The version of the software requested by the ECU 121 is specified by the old version information. In response to the request from the ECU 121, the mobile equipment 300 acquires the software (body) of the specified version from the OTA center 500 (S22 in FIG. 4), and sends the acquired software (body) to the vehicle 100 (ECU 121) (S23 in FIG. 4). The ECU 121 receives the old software (body) from the mobile equipment 300 and writes the old software to the bank of the single-bank microcomputer MC1. Thereafter, the bank to which the old software has been written serves as an active bank. In this case, the single-bank microcomputer MC1 is started with the old software (pre-update program).

Referring back to FIG. 4 together with FIGS. 1 and 2, the target ECU performs the rollback process for the update target in S46 as described above. When the activation for the update target fails due to something going wrong during the activation, the target ECU may restore the update target to a normal state using a pre-update journal file (file to which log information is written). When the requested rollback is completed, the target ECU notifies the ECU 110 of the completion of the rollback. When the ECU 110 receives the rollback completion notification, the ECU 110 requests identification information of the pre-update software (ECU software ID) from the target ECU. The ECU 110 then checks whether the identification information received from the target ECU matches identification information of the pre-update software in the campaign information (configuration verification). Successful configuration verification (i.e., the above pieces of software identification information matching each other) means that the rollback was successful. When the above pieces of software identification information do not match each other, the ECU 110 may request the target ECU to perform the rollback again.

When the rollback is successful, the process proceeds to S47. When the activation for the update target is successful (YES in S42) and the activation has not failed in any of the microcomputers that cooperate with the update target (NO in S43), the process proceeds to S47. When the update target includes a plurality of microcomputers (computers), S41 to S46 and S21 to S23 are performed for each update target. When the activation or rollback is successful for all of the update targets, the vehicle 100 (ECU 110) sends an end notification to the mobile equipment 300 in S47. After S47 is performed, the series of steps S31 to S47 by the vehicle 100 ends.

In S24, the mobile equipment 300 determines whether it has received the end notification (S47) from the vehicle 100. When the mobile equipment 300 has not received the end notification (NO in S24), the process returns to S21. When the mobile equipment 300 has received the end notification (YES in S24), the series of steps S11 to S24 by the mobile equipment 300 ends.

As described above, the software distribution system according to the present embodiment includes the mobile equipment 300, the vehicle 100, and the OTA center 500 (server). The mobile equipment 300 includes the processor 310 and the memory 320 (storage unit). The processor 310 is configured to receive update software for a single bank-type computer installed in the vehicle 100 from the OTA center 500 (S16 in FIG. 3), acquire rollback data (e.g., version information of pre-update software on the single bank-type computer) (S17 in FIG. 3), generate an RB package including the update software and the rollback data (S18 in FIG. 3), and send a distribution package including the generated RB package to the vehicle 100 (S19 in FIG. 3).

The mobile equipment 300 having the above configuration can add the rollback data to the update software received from the OTA center 500. As described above, the mobile equipment 300 sends the package including both the update software and the rollback data to the vehicle 100. This allows the vehicle 100 to perform rollback using the rollback data when a software update (e.g., activation) on a single bank-type computer (e.g., the single-bank microcomputer MC1 shown in FIG. 6) fails. A suitable software update can thus be performed on not only a dual bank-type computer but also a single bank-type computer installed in the vehicle 100 by the OTA technology.

During a software update on a single bank-type computer, the processor 310 of the mobile equipment 300 repeats steps S14, S15 until the memory 320 (storage unit) has enough free space to generate an RB package (NO in S14). Therefore, the vehicle 100 repeats S33. The software update is thus suspended. Once the memory 320 has enough free space to generate an RB package (YES in S14), the mobile equipment 300 sends a distribution package (S19) to permit the software update on the single bank-type computer. The process of the vehicle 100 thus proceeds to S34, and the software update on the single bank-type computer is performed. The process described above reduces the possibility that the software update may proceed in a situation in which rollback cannot be performed. The processor 310 is configured to give the predetermined notification (S15) when there is not enough free space in the memory 320 (storage unit) to generate an RB packet (NO in S14) during the software update on the single bank-type computer. Such a notification process allows the user to easily grasp the situation.

The vehicle 100 according to the present embodiment includes the ECU 110 (control device) configured to manage the software update sequence. The ECU 110 is configured to perform a software update on a single bank-type computer using update software received from the mobile equipment 300 (S34 in FIGS. 3 and S41 in FIG. 4), and when the software update fails, perform rollback using rollback software (e.g., version information of pre-update software on the single bank-type computer) (S44 to S46 in FIG. 4). According to the vehicle 100 having such a configuration, the software update can be easily managed by the vehicle 100.

The processes shown in FIGS. 3 and 4 can be changed as appropriate. For example, in the above embodiment, whether an update target is a single-bank microcomputer is determined in S13 (FIG. 3) and S44 (FIG. 4). Some vehicles are equipped with an ECU containing a single-bank microcomputer with a storage unit for rollback. In a system for distributing software to such vehicles, whether an update target is a single-bank microcomputer without a storage unit for rollback may be determined in S13 (FIG. 3) and S44 (FIG. 4). That is, the system may be configured so that the determination result in each of S13 (FIG. 3) and S44 (FIG. 4) is NO when the update target is a single-bank microcomputer but has a storage unit for rollback. Examples of the single-bank microcomputer with a storage unit for rollback include a single-bank microcomputer with a storage unit for rollback in the bank, and a single-bank microcomputer with an external storage unit (non-volatile memory) for rollback. Such single-bank microcomputers can perform rollback in a manner similar to that of dual-bank microcomputers.

The rollback data is not limited to the old version information described above. Any data that is used for rollback can be used as rollback data. A modification in which a difference file between new software (update software) and old software (pre-update software) is used as rollback data will be described with reference to FIGS. 7 to 9.

Figure 7:
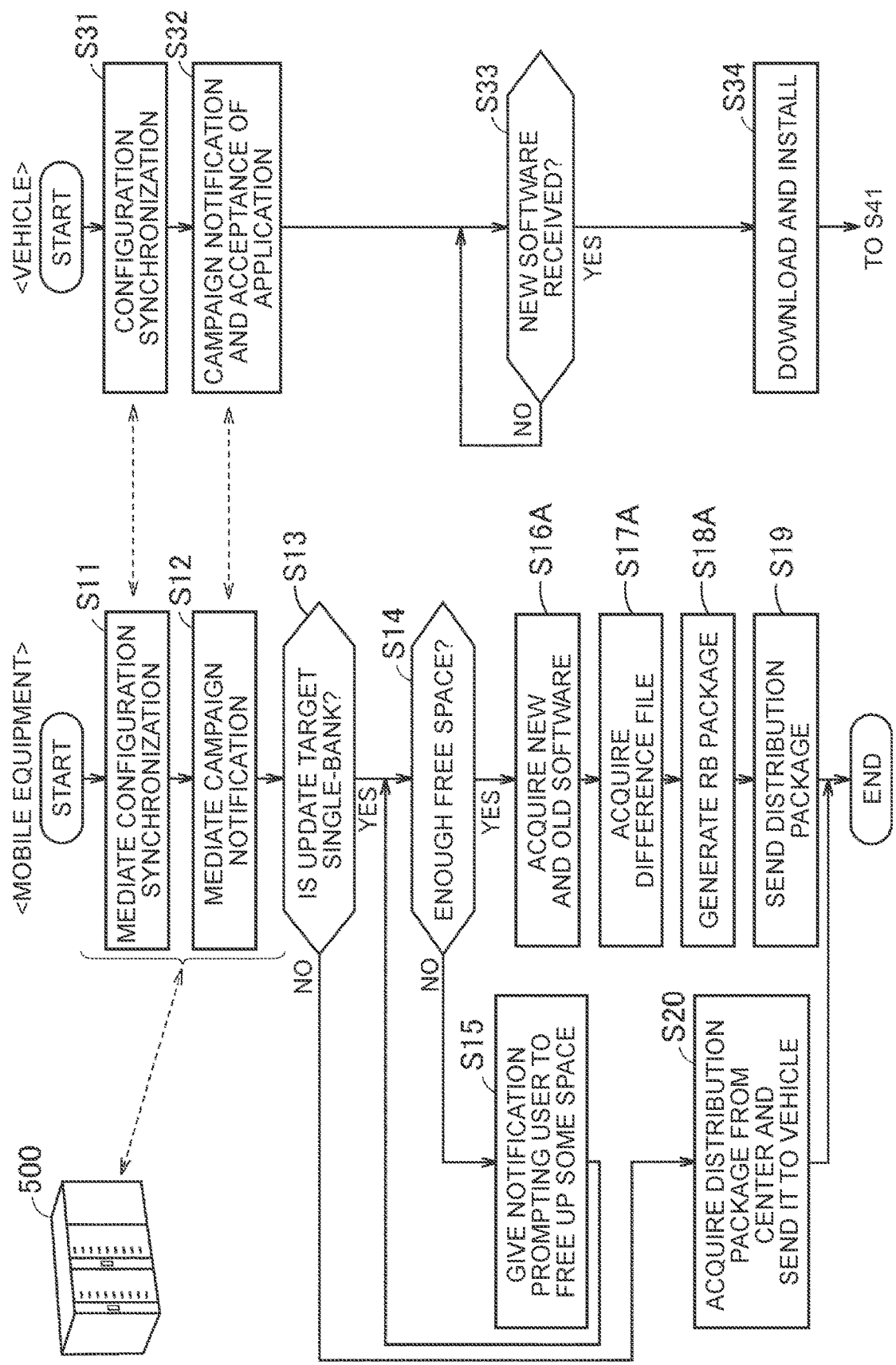
FIG. 7 is a flowchart showing a modification of the process shown in FIG. 3.

FIG. 7 is a flowchart showing a modification of the process shown in FIG. 3. Referring to FIG. 7 together with FIGS. 1 and 2, in this modification, S16A to S18A are used instead of S16 to S18 (FIG. 3). In S16A, the mobile equipment 300 acquires new software for an update target (new version of software body) from the OTA center 500 by wireless communication, and acquires old software on the update target (pre-update version of software body) from the vehicle 100 by wireless communication. Thereafter, in S17A, the mobile equipment 300 generates a difference file between the new software for the update target and the old software on the update target, based on the new software and the old software. The difference file indicates the difference between the new software and the old software. Therefore, the old software is derived from the new software and the difference file. The new software is derived from the old software and the difference file. Thereafter, in S18A, the mobile equipment 300 generates an RB package including the new software for the update target (update software) and the difference file (rollback data). Subsequently, in S19, the mobile equipment 300 sends a distribution package including the RB package (S18A) to the vehicle 100 by wireless communication. In this modification, when step S19 or S20 is performed for all of the update targets, the process related to software update by the mobile equipment 300 ends.

Figure 8:
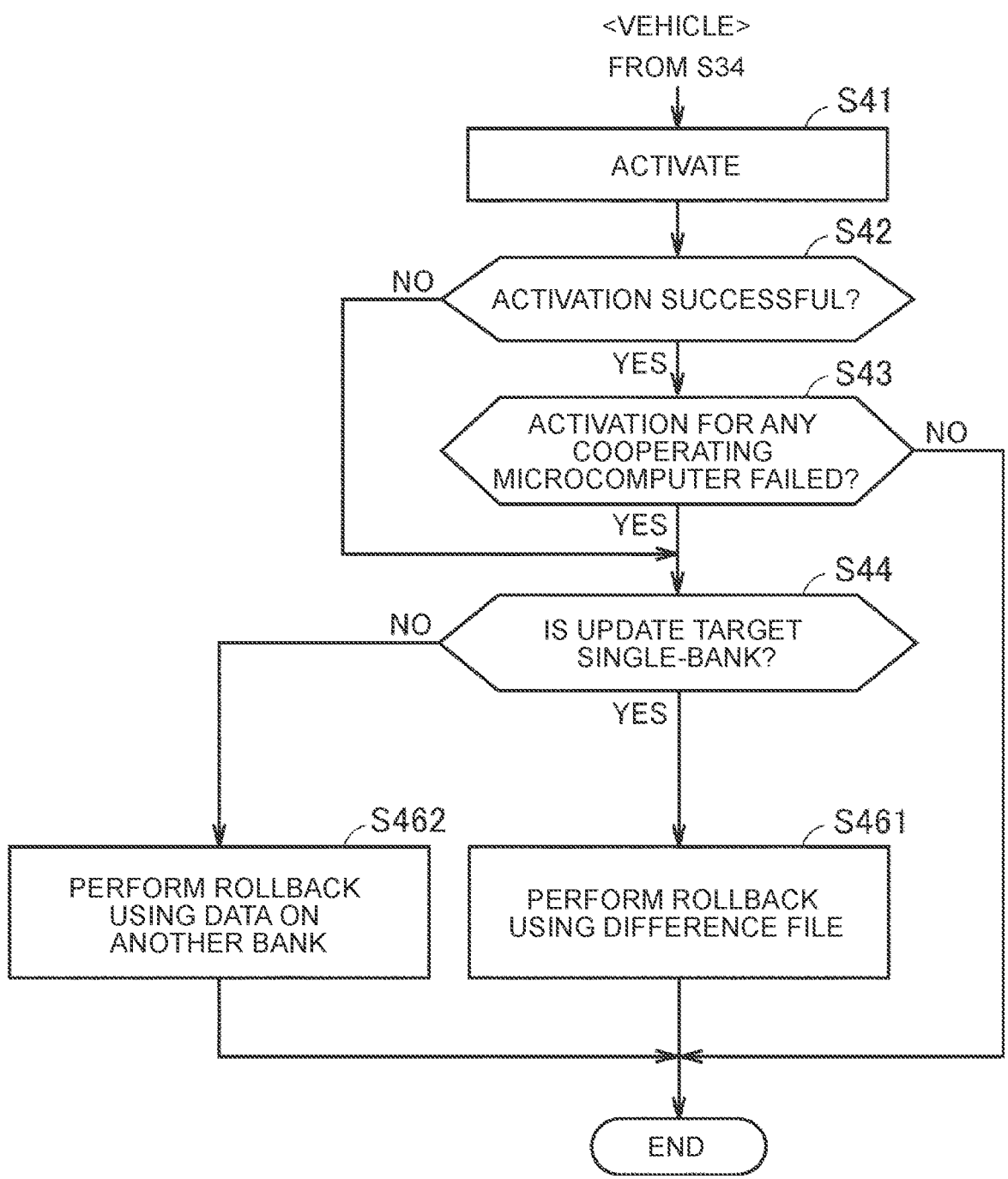
FIG. 8 is a flowchart showing a modification of the process of a vehicle shown in FIG. 4.

When the vehicle 100 has received the distribution package (S19 or S20) from the mobile equipment 300 (YES in S33), the ECU 110 downloads and installs the new software in S34. The ECU 110 then starts a series of steps shown in FIG. 8 described below. FIG. 8 is a flowchart showing a modification of the process of the vehicle 100 shown in FIG. 4.

Referring to FIG. 8 together with FIGS. 1 and 2, in this modification, S461 and S462 are used instead of S45 to S47 (FIG. 4). The target ECU performs activation for the update target in S41. When the target ECU receives a rollback request from the ECU 110 in S42 or S43 that is the same step as that in the process shown in FIG. 4, the process proceeds to S44. In S44, the target ECU determines whether the update target is a single-bank microcomputer. When the update target is a single-bank microcomputer (YES in S44), the target ECU of the vehicle 100 performs a rollback process for the update target (process of restoring the software on the update target to the old software) in S461 by using the difference file (rollback data) described above. On the other hand, when the update target is not a single-bank microcomputer (NO in S44), the target ECU of the vehicle 100 performs a rollback process for the update target in S462 by using data on another bank of the update target (e.g., original version of software remaining on the active bank) (see FIG. 5).

Figure 9:
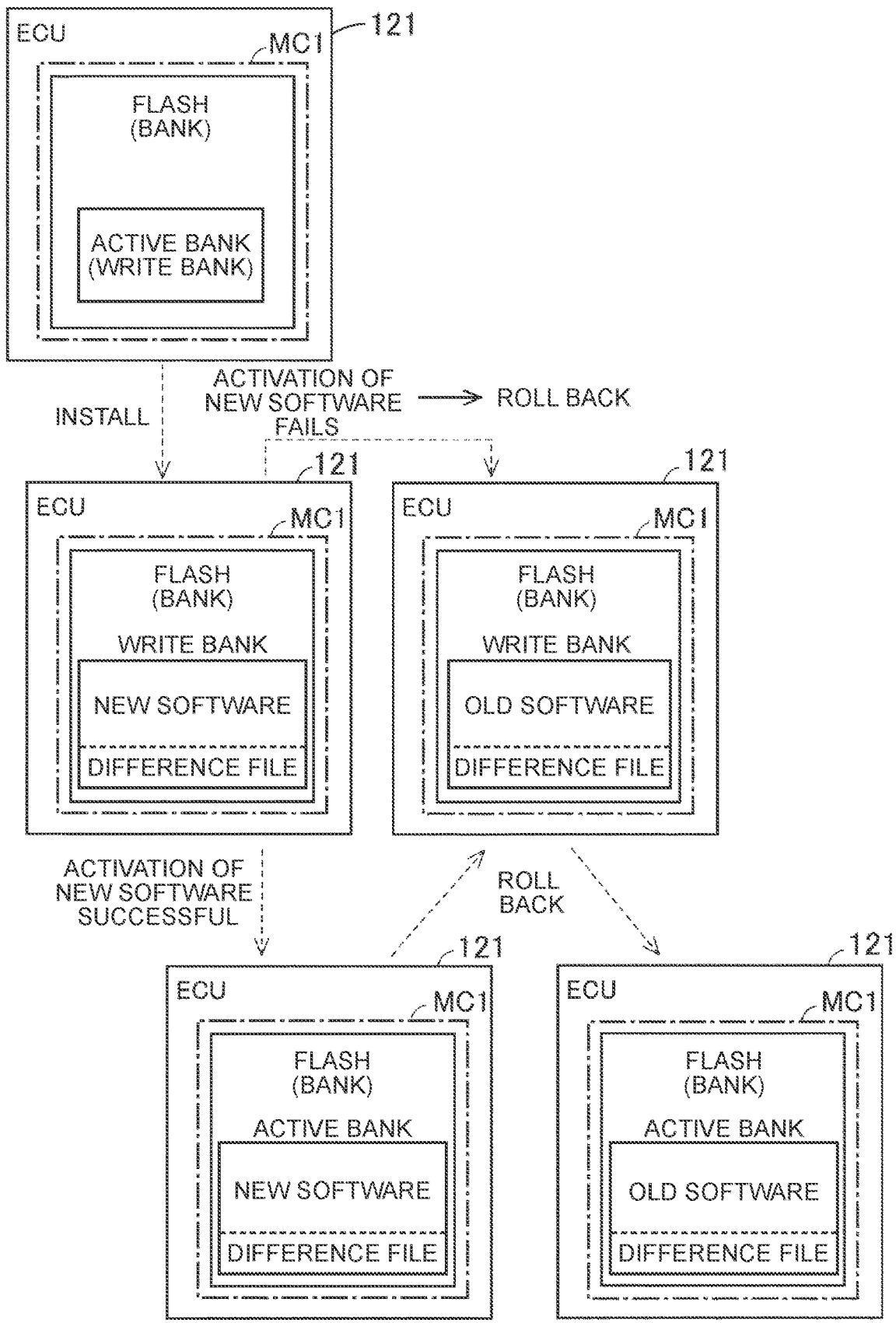
FIG. 9 illustrates particularly a rollback process for a single-bank microcomputer in the process shown in FIG. 8.

FIG. 9 illustrates step S461 (rollback process for a single-bank microcomputer). Referring to FIG. 9, the rollback data (difference file between the new software for the update target and the old software on the update target) is written in succession to the new software to the write bank of the single-bank microcomputer MC1. The ECU 121 (target ECU) then switches the write bank of the single-bank microcomputer MC1 to an active bank (activation) in S41 of FIG. 8. When the ECU 121 successfully performs the activation for the single-bank microcomputer MC1 and does not receive a rollback request from the ECU 110, the ECU 121 waits for a shutdown request from the ECU 110 after performing self-reset. In this case, the bank to which the new software has been written serves as an active bank. That is, the single-bank microcomputer MC1 is started with the new software (updated program).

On the other hand, when the ECU 121 receives a rollback request from the ECU 110, the ECU 121 performs the rollback process for the single-bank microcomputer MC1 (S461 in FIG. 8). Specifically, the ECU 121 restores the new software to the old software using the difference file. Thereafter, the bank that has been rewritten with the old software serves as an active bank. In this case, the single-bank microcomputer MC1 is started with the old software (pre-update program).

According to the software distribution system of the modification as well, a suitable software update can be performed even on a single bank-type computer installed in the vehicle 100 by the OTA technology. According to the software distribution system described above, the vehicle 100 can perform rollback even when communication between the mobile equipment 300 and the vehicle 100 is interrupted due to a communication failure etc. after the mobile equipment 300 sends a package to the vehicle 100.

The reception unit, acquisition unit, generation unit, update unit, notification unit, and transmission unit of the mobile equipment 300 may be implemented by dedicated hardware (electronic circuitry) rather than by software. In the above embodiment, an on-premises server is used as the OTA center 500 (see FIG. 1). However, the OTA center 500 is not limited to this, and the functions of the OTA center 500 (e.g., a function related to software update) may be implemented on a cloud through cloud computing. That is, the OTA center 500 may be a cloud server.

The vehicle may include an OTA master having an OTA access function. The vehicle may include a telematics control unit (TCU) and/or a Data Communication Module (DCM) that wirelessly communicates with the OTA center. The vehicle need not necessarily be a vehicle configured to perform automated driving. The vehicle may be an electrified vehicle (xEV) other than a BEV. The vehicle may be equipped with an internal combustion engine (e.g., a gasoline engine, a biofuel engine, or a hydrogen engine). The vehicle is not limited to a four-wheeled passenger vehicle, and may be a bus or a truck, or may be a three-wheeled xEV. The vehicle may have a flight function. The vehicle may be a Mobility-as-a-Service (MaaS) vehicle. The vehicle may be a multipurpose vehicle that is customized according to the user's intended use of the vehicle. The vehicle may be a mobile shop vehicle, a robotaxi, an automated guided vehicle (AGV), or an agricultural machine. The vehicle may be a small-sized unmanned or single-seater BEV (e.g., a last-mile BEV, an electric wheelchair, or an electric skateboard). The above various modifications may be implemented in any combination.

The embodiment disclosed herein should be construed as illustrative in all respects and not restrictive. The scope of the present disclosure is shown by the claims rather than by the above description of the embodiment and is intended to include all modifications within the meaning and scope equivalent to the claims.

What is claimed is:

1. Mobile equipment comprising:
   one or more first processors;
   one or more memories, wherein the one or more first processors are configured to, in a software update on the single bank-type computer, suspend the software update until the one or more memories have enough free space to generate the package, and permit the software update on the single bank-type computer once the one or more memories have enough free space to generate the package; and
   a communication module, wherein
   the one or more first processors are configured to control the communication module to receive update software for a single bank-type computer installed in a vehicle from a server,
   the one or more first processors are configured to control the communication module to acquire rollback data,
   the one or more first processors are configured to generate a package including the update software and the rollback data, and
   the one or more first processors are configured to control the communication module to send the package to the vehicle.

2. The mobile equipment according to claim 1, wherein the rollback data includes a difference file between the update software and pre-update software.

3. The mobile equipment according to claim 1, wherein the rollback data includes version information of pre-update software on the single bank-type computer.

4. The mobile equipment according to claim 1, wherein the one or more first processors are configured to give a predetermined notification when there is not enough free space in the one or more memories to generate the package during the software update on the single bank-type computer.

5. The mobile equipment according to claim 1, wherein:
   the communication module is configured to acquire the update software from the server by wireless communication; and
   the communication module is configured to send the package to the vehicle by wireless communication.

6. The mobile equipment according to claim 5, wherein the mobile equipment is a smartphone.

7. A software distribution system comprising:
   the mobile equipment according to claim 1;
   the vehicle; and
   the server, wherein the vehicle includes a control device including one or more second processors and configured to manage a software update sequence, and
   the one or more second processors are configured to perform a software update on the single bank-type computer using the update software received from the mobile equipment, and when the software update fails, perform rollback data using the rollback data.

8. The software distribution system according to claim 7, wherein the single bank-type computer is a computer configured to control travel of the vehicle.

* * * * *